United States Patent Office 3,198,828
Patented Aug. 3, 1965

3,198,828
COMPOUNDS OF CITRIC ACID
Erich Matter, Basel, Switzerland, assignor to Ciba Limited, Basel, Switzerland
No Drawing. Filed Dec. 23, 1960, Ser. No. 77,797
Claims priority, application Switzerland, Dec. 29, 1959, 82,382
6 Claims. (Cl. 260—534)

The present invention provides new amides of citric acid containing as amide radical at least one radical of an alkylene diamine further substituted at one nitrogen atom by a higher aliphatic hydrocarbon radical.

If desired, these new compounds of citric acid may further contain at least one radical of a lower aliphatic monoamine or polyamine as amide radical or a hydrazide radical. Alternatively, two citric acid amide radicals each containing as amide radicals one or two radicals of an alkylene diamine further substituted at one nitrogen atom by a higher aliphatic hydrocarbon radical, are linked together through an aliphatic di- or polyamine, the points of attachment being the amide bonds between (a) a carboxyl group of each of the two citric acid amide radicals and (b) an amino group of the di- or polyamine.

According to the present invention the new compounds are manufactured by monoacylating an alkylene diamine, which is further substituted at one nitrogen atom by a higher aliphatic hydrocarbon radical, with citric acid or a reactive functional derivative thereof and, if desired, carrying out further acylation reactions with the resulting acyl compounds which still contain groups capable of acylation.

As alkylene diamines substituted at a nitrogen atom by a higher hydrocarbon radical, which are to be acylated according to the invention, there are particularly suitable those in which the aforementioned hydrocarbon radical contains 10 to 22 carbon atoms. As examples may be mentioned: N-dodecyl trimethylene diamine, N-hexadecyl trimethylene diamine, N-octadecyl trimethylene diamine and N-octadecenyl trimethylene diamine. It is also possible to use alkylene diamines that contain instead of the trimethylene diamine radical another diamine radical, preferably those which contain 2 to 6 carbon atoms between the two nitrogen atoms.

Instead of the straight alkylene diamines, substituted at one nitrogen atom by an aliphatic hydrocarbon radical, there may also be used mixtures of such compounds as starting material for the reaction with citric acid.

The new compounds formed in the first stage of the process thus correspond, for example, to the general formula (1)
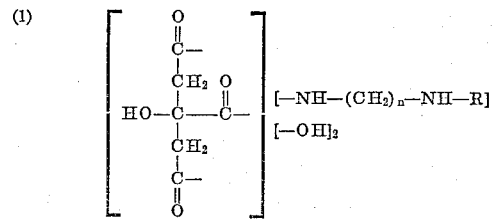

or (1a)
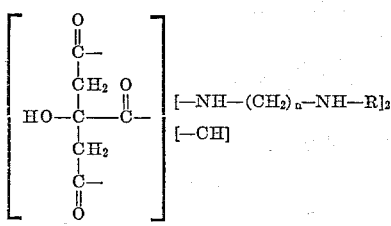

respectively, in which R represents an aliphatic hydrocarbon radical preferably containing 10 to 22 carbon atoms and $n$ is a whole number, preferably from 2 to 6.

The new compounds, which thus still contain at least one carboxyl group capable of acylation, may if desired be further condensed with preferably lower aliphatic monoamines, diamines or polyamines. Furthermore, it is also possible to react them with a hydrazine compound, for example hydrazine hydrate.

Aliphatic amines, suitable for this further reaction, are for example:

Ethanolamine, aminoethyl ethanolamine, N:N-dimethylamino trimethylene diamine, ethylene diamine, diethylene triamine and the like.

Alternatively, 2 mols of the acylation products of citric acid formed in the first step which contain carboxyl groups capable of acylation may be reacted with 1 mol of a di- or polyamine, for example ethylene diamine or diethylene triamine.

Thus, the new compounds are, for example, amides of citric acid corresponding to the general formula (2)
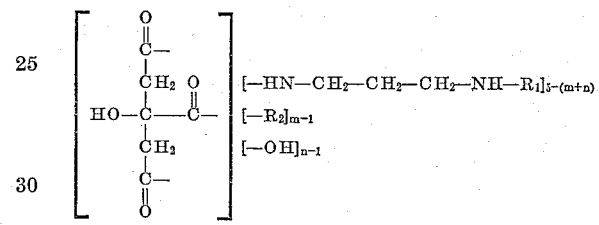

in which $R_1$ represents an aliphatic hydrocarbon radical with 12 to 18 carbon atoms, $R_2$ the radical of a non-cyclic nitrogen base linked at one nitrogen atom with the citric acid radical, which nitrogen base, inasmuch as it is a di- or polyamine, may be linked at a second nitrogen atom in amide fashion with a carboxyl radical of a further citric acid amide radical of Formula 2, $m$ and $n$ each is 1, 2 or 3 and the sum $(m+n)$ is at least 3 and at most 4.

Those compounds of the general Formula 2 are outstanding in which $R_2$ represents the radical —NH—CH$_2$—CH$_2$—OH
—NH—CH$_2$—CH$_2$—NH—CH$_2$—CH$_2$—OH
—NH—(CH$_2$)$_3$—N(CH$_3$)$_2$
—NH—CH$_2$—CH$_2$—NH$_2$
—NH—CH$_2$—CH$_2$—NH—CH$_2$—CH$_2$—NH$_2$ or —NH—NH$_2$; furthermore those amides which correspond to the general formula (2a)    A—[—R—]—A in which A represents the radical of the compound

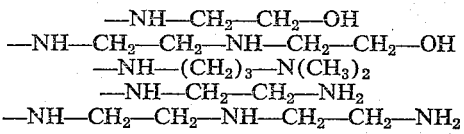
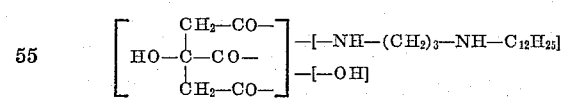

and —R— represents the residue of an aliphatic di- or polyamine, for example an ethylene diamine or diethylene triamine.

In the first stage of the process for the manufacture of the new compounds the alkylene diamine substituted at one nitrogen atom by a higher aliphatic hydrocarbon radical is reacted in the desired molecular proportions with citric acid or with a functional derivative thereof. The reaction is performed with particular advantage in a suitable organic solvent, for example xylene; in this case the reaction is carried out with heating at the boil, advantageously under nitrogen, and the eliminated water is collected in a water separator.

By adding a small amount of boric acid or toluenesulfonic acid the elimination of water can be promoted in the desired manner and accelerated. In this case the condensation reaction is carried out, if possible, so that approximately just as much water is eliminated as can be theoretically expected in connection with the formation of the acylamino compound.

When the primary reaction product still contains—as does, for example, the compound of the general Formula 1—two carboxyl groups capable of acylation it is possible according to the present process to further react either both or only one of these groups with one of the lower aliphatic amines or, when the aliphatic amine contains more than one reactive N-atom, 2 mols of the reaction product of citric acid formed in the first step may be further reacted with 1 mol of the amine. These further condensations can be carried out following upon the first acylation, if desired in the same reaction vessel and in general under identical reaction conditions, by cautiously adding the amine or the hydrazine compound concerned.

The new compounds of the invention are excellent agents for preventing infestation of dead or living material by microorganisms, which makes them valuable preservatives and disinfectants. The compounds are active both as bactericides and fungicides.

Of special importance is the fact that the new compounds do not lose their bactericidal and fungicidal activity even in the presence of proteinic substances. This advantage makes the compounds suitable for preserving or disinfecting protein in all forms as well as mixtures containing proteinic substances. As is known, protein is very prone to infestation by microorganisms, more especially in the presence of water. In addition, it is known that many compounds that as such are very active against microorganisms, such, for example, as certain quaternary ammonium salts, are considerably inhibited in their action by the presence of protein. Thus, the efficient preservation and disinfection of protein and of other substances in the presence of protein is a problem of general significance. Numerous other compounds, such, for example, as certain chlorinated phenols which have also been proposed as preservatives or disinfectants for proteinic substances, have a disturbing odour and in many cases produce irritations of the skin. The compounds of the present invention do not have the above disadvantages.

The new compounds can be used inter alia for preserving or disinfecting a wide variety of industrial products, such as, for example textile assistants or finishing agents, glues, binders, paints, varnishes, lacquers, thickening agents and the like.

A particularly important application of the new compounds is the preservation of casein and of preparations of all kinds containing casein.

Above all it is possible with the aid of the new compounds to achieve effective preservation of dyestuff pastes and printing pastes and similar compositions which are based on organic or inorganic dyestuffs or pigments and contain in admixture casein or another organic compound and to extend their pot life quite considerably.

The new compounds can further be used for cleaning apparatus and containers of a very wide variety of materials, for example, wood, metal or plastics; this is of special importance when such apparatus or containers are used for the manufacture, processing or storing of products containing a proteinic substance, for example casein, since in such a case the risk of infestation by microorganisms is particularly great. Also paints used for painting walls and ceilings, for example such as contain a proteinic pigment binder, are effectively protected from infestation by microorganisms when one of the new compounds has been added thereto. The new substances are of particular importance as disinfectants in veterinary hygiene and as preserving agents in agriculture or foodstuffs industry.

Furthermore the new compounds can be used for protecting fibers and textile materials. The addition of the new compound may take place before, together with, or after a treatment of said textile materials with other substances, for example dyeing or printing pastes, dressings or the like. The new compounds may also be used as preservatives in the cellulose and paper industries.

Another advantageous form of using the new compounds is the combination with a detergent or surfactant; of special advantage is the combination with substances produced by total or partial synthesis. The new compounds have the advantage that they can be processed also together with cationic products or that they are cationic themselves. Furthermore, they are distinguished by a high foaming power, they do not produce disturbing precipitates with fatty acids and are readily tolerated at least by healthy skin. The antibacterial or antimycotic activity of the new compounds is not only unimpaired by the addition of detergents, for example of non-ionogenic products, but in many cases such a combination produces a surprising enhancement of effect. The new compounds are also suitable as additives to products consisting wholly or partially of inorganic ingredients, for example phosphates or silicates.

In whatever form they are used the aforementioned products may also contain further bactericides, fungicides or insecticides. The fact that the new compounds do not lose their activity towards microorganisms even in the presence of proteinic substances, thus for example also of blood or serum, enables them to be used as preservatives for biological, hygienic and cosmetic purposes. The new compounds may also be used as constituents of preparations used for cleaning or disinfection in hospitals and in medicinal practice, thus, for example, for cleaning patients' bedding and underwear, wards and apparatus; for this purpose the new compounds may, if necessary, be combined with other disinfectants and products having antiseptic activity to enable them to satisfy individual requirements connected with cleaning and disinfection.

The new compounds can further also be incorporated in preparations used for cleaning the skin, for example the hands, having an antibacterial or antimycotic effect, if necessary together with other bactericidal or fungicidal substances, skin protecting agents and the like; furthermore, they are effective against unpleasant body odours produced by micro-organisms. In this case it is of advantage that the new compounds are not inactivated by the protein of the skin. The compounds of the invention are especially suitable for use in shampoos. They may be used in an appropriate dilution as such or in the presence of other adjuvants serving as foaming agents or detergents.

EXAMPLE 1

A stirring flask of 2 liters capacity, equipped with thermometer, gas introduction tube and water separator with condenser is charged with 320 grams of N-dodecyl trimethylene diamine, 600 grams of xylene, 2 grams of toluenesulfonic acid and 96 grams of citric acid. While being stirred, the reaction mixture is heated to the boil under nitrogen, whereupon a complete solution is obtained. After 60 to 80 minutes 19.5 cc. of water have collected in the water separator, and the contents of the flask are then cooled. The reaction mixture is introduced into a flask of 3 liters capacity and the xylene is distilled off in vacuo under nitrogen. To complete the removal of the xylene, the residue present at the end of the distillation is heated for 2 to 3 hours in a vacuum of 12–15 mm. Hg at 100–115° C.

Yield: about 397 grams of the compound of the formula (3)

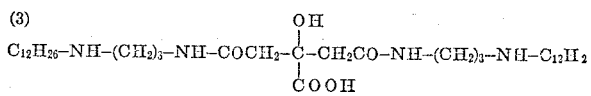

[In the Formulae 3 to 13 the substituents at the group

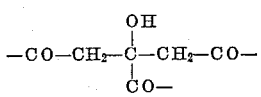

are interchangeable.]

EXAMPLE 2

A stirring flask of 2 liters capacity, equipped with thermometer, gas introduction tube, dropping funnel and water separator with condenser is charged with 320 grams (7) $C_{12}H_{25}-NH-(CH_2)_3-NH-C_{12}H_{25}$ 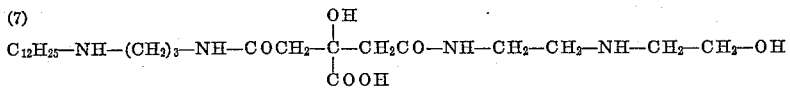

of N-dodecyl trimethylene diamine, 600 grams of xylene, 2 grams of toluenesulfonic acid and 96 grams of citric acid. The whole is heated at the boil under nitrogen until 19.5 cc. of water have collected in the water separator.

The contents of the flask are cooled to about 100° C., and 30 grams of ethanolamine are then run in from the dropping funnel. The reaction mixture is once again raised to the boil, during which another 9 to 10 cc. of water should separate.

At about 50 to 55° C. the brown mixture is transferred to a round-bottom flask of 5 liters capacity and the xylene is distilled off under nitrogen. The residue so obtained is a viscous, brown paste which forms clear solutions with dilute acid.

Yield: About 418 grams of the compound of the formula (4) 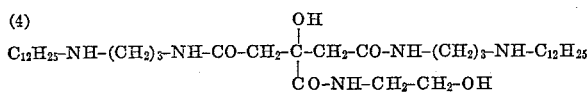

EXAMPLE 3

320 grams of N-dodecyl trimethylene diamine are condensed with 96 grams of citric acid as described in Example 1.

After 19.5 cc. of water have separated, 52 grams of aminoethyl ethanolamine are added and the whole is further heated at the boil until 9 to 10 cc. of water have collected in the water separator.

The xylene is removed under reduced pressure.

The reaction product is a viscous, brown substance which gives a clear solution in dilute acid.

Yield: About 439 grams of the compound of the formula (5) 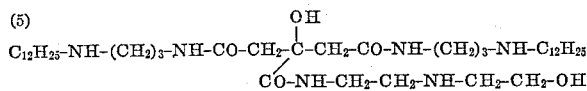

EXAMPLE 4

A stirring flask of 1 liter capacity equipped with thermometer, gas inlet tube and water separator with condenser is charged with 400 grams of xylene, 2 grams of toluenesulfonic acid, 13 grams of hydrazine hydrate and 198 grams of the product prepared as described in Example 1.

The mixture is heated at the boil under nitrogen until 9 to 10 cc. of water have collected in the water separator. The xylene is removed in vacuo under nitrogen.

As residue there are obtained about 204 grams of a brown paste which forms opalescent solutions with dilute acids and consists of the compound of the formula (6) 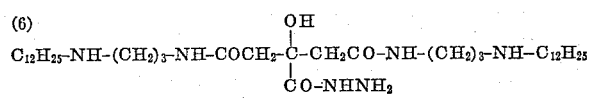

EXAMPLE 5

A stirring flask of 2 liter capacity is charged with 320 grams of N-dodecyl trimethylene diamine, 1 gram of toluenesulfonic acid, 600 grams of xylene and 192 grams of citric acid.

The whole is heated at the boil with stirring under nitrogen until 19 to 19.5 cc. of water have collected in the water separator, which takes about 15 minutes.

The whole is cooled to 90 to 100° C., 104 grams of aminoethyl ethanolamine are run in and the mixture is once again raised to the boil. After 25 minutes another 19 cc. of water have separated and the reaction is complete. The xylene is removed in the usual manner, to leave about 575 grams of the compound of the formula

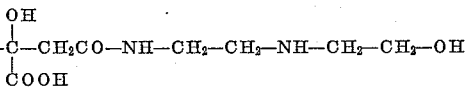

in the form of a brown mass.

EXAMPLE 6

In a stirring flask of 2 liters capacity a mixture of 160 grams of N-dodecyl trimethylene diamine, 550 grams of xylene, 0.5 gram of toluenesulfonic acid and 96 grams of citric acid is heated to the boil under nitrogen until 9 to 10 cc. of water have collected in the water separator.

After about 20 minutes the reaction is complete. The reaction mixture is allowed to cool slightly, whereupon 30.5 grams of ethanolamine are added and the mixture is then once again raised to the boil, whereby another 9 to 10 cc. of water should separate. Finally, the xylene is removed under reduced pressure.

There are obtained about 264 grams of a brown, viscous substance. The cooled compound corresponds to the formula (8) 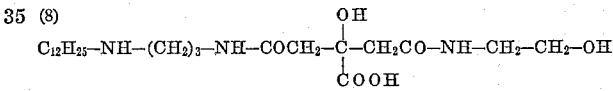

EXAMPLE 7

In a stirring flask of 2 liters capacity a mixture of 160 grams of N-dodecyl trimethylene diamine, 550 grams of xylene, 0.3 gram of toluenesulfonic acid and 96 grams of citric acid is heated under nitrogen until 9 to 10 cc. of water have collected in the water separator. At 80 to 100° C. 61 grams of ethanolamine are added and another 19 to 19.5 cc. of water are allowed to collect. After removing the xylene a brown, viscous substance is obtained in a yield of about 281 grams of the compound of the formula (9) 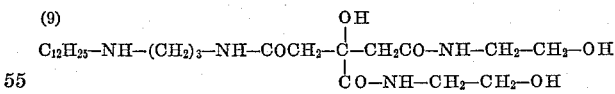

With dilute acid the product forms clear, copiously foaming solutions.

EXAMPLE 8

A stirring flask of 3 liter capacity is charged with 320 grams of N-dodecyl trimethylene diamine, 650 grams of xylene, 2 grams of boric acid and 192 grams of citric acid. 19 to 19.5 cc. of water are allowed to separate under nitrogen. At 80 to 90° C. 102 grams of N:N-dimethyltrimethylene diamine are added and another 19 to 19.5 cc. of water are allowed to separate. The xylene is removed and there is obtained a brown, viscous substance in an amount of about 569 grams of the compound of the formula

(10) 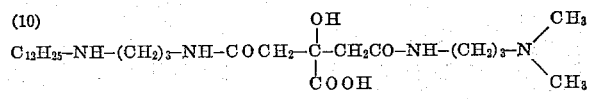

EXAMPLE 9

A stirring flask of 2 liters capacity is charged with 320 grams of N-dodecyl trimethylene diamine, 600 grams of xylene, 2 grams of toluenesulfonic acid and 192 grams of citric acid, and the whole is heated to the boil under nitrogen. When 19 to 19.5 cc. of water have collected in the water separator, the reaction mixture is cooled and the xylene is removed in vacuo under nitrogen at 100 to 115° C.

A brown, hard substance is obtained in a yield of about 495 grams of the compound of the formula

(11) 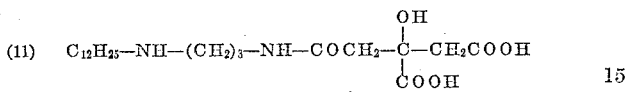

The product dissolves in dilute acids and alkali solutions with copious foaming.

EXAMPLE 10

A stirring flask of 2 liters capacity is charged with 400 grams of a commercial mixture of N-octadecyl trimethylene diamine and N-hexadecyl trimethylene diamine, 600 grams of xylene, 2 grams of toluenesulfonic acid and 192 grams of citric acid. The whole is heated at the boil under nitrogen until 19.5 cc. of water have collected in the water separator. The xylene is removed in vacuo under nitrogen, to yield about 566 grams of a brown, solid substance.

With acids the product forms clear solutions, while with alkalies opalescent solutions are obtained. The product corresponds to the general formula

(12) 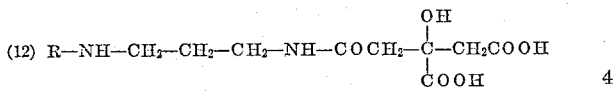

in which R represents an aliphatic hydrocarbon residue with 16 to 18 carbon atoms.

EXAMPLE 11

400 grams of a commercial mixture of N-octadecyl trimethylene diamine and N-hexadecyl trimethylene diamine, 700 grams of xylene, 2 grams of toluenesulfonic acid and 96 grams of citric acid are heated in a stirring flask of 2 liters capacity. When 19 to 19.5 cc. of water have collected in the water separator, the reaction is complete and the xylene is removed in vacuo under nitrogen.

The reaction product forms a brown, firm paste weighing about 471 grams. With dilute acids it gives clear solutions.

The product corresponds to the general formula

(13) 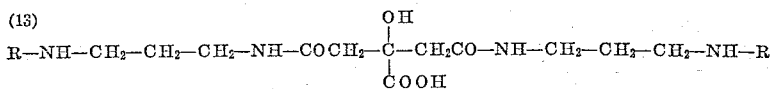

in which R represents an aliphatic hydrocarbon residue with 16 to 18 carbon atoms.

EXAMPLE 12

A stirring flask of 5 liters capacity is charged with 640 grams of N-dodecyl-trimethylene diamine, 1300 grams of xylene, 3 grams of toluenesulfonic acid and 384 grams of citric acid. The air is carefully expelled by nitrogen, and the whole is then heated to the boil with stirring, the product gradually dissolving. When 38 to 38.5 cc. of water have collected in the water separator, 60 grams of ethylene diamine are allowed to run in from a dropping funnel at a temperature of the reaction mixture in the flask of about 70 to 80° C.

The whole is again heated to the boil until a further 36 to 37.5 cc. of water have collected in the water separator.

The xylene is removed in vacuo under nitrogen at 110 to 115° C., and the reaction mixture is then heated for 2 to 3 hours at 110 to 115° C. in vacuo under 12 to 20 mm. pressure of mercury.

About 1012 grams of a viscous paste are obtained which with dilute acids forms forming, opal and stable solutions.

The product obtained corresponds to the formula

(14) 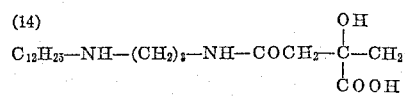

EXAMPLE 13

In a stirring flask of 5 liters capacity 640 grams of N-dodecyl trimethylene diamine, 1300 grams of xylene, 3 grams to toluenesulfonic acid and 384 grams of citric acid are mixed under nitrogen and heated to the boil. When 38 cc. of water have collected in the water separator, the reaction mixture is cooled to 50° C. and 105 grams of diethylene triamine are added.

The reaction mixture is again heated to the boil until another 36 to 37 cc. of water have collected. The xylene is removed in vacuo and the dark colored residue taken up in 1100 grams of ethanol, treated with active charcoal, filtered and concentrated.

There are obtained about 1063 grams of a paste which with dilute acids forms copiously foaming solutions. The product obtained corresponds to the formula

(15) 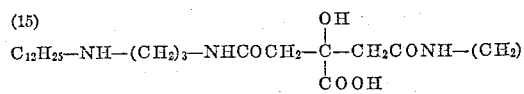

In the following Examples 14 to 16 the new compounds, in the form of their lactates, were used as aqueous solutions.

EXAMPLE 14

(a) The following aqueous solutions are prepared containing each 20% of casein, 2.4% of $Na_2B_4O_7 \cdot 10\ H_2O$, as well as the following additives:

| Solution: | Additive |
|---|---|
| a | None. |
| b | 1% of phenol. |
| c | 0.5% of 6-chloro-3-hydroxy-1-methylbenzene ("para-chloro-meta-cresol"). |
| d | 0.5% of the compound of the Formula 3. |
| e | 0.3% of the compound of the Formula 3. |
| f | 0.1% of the compound of the Formula 3. |
| g | 0.05% of the compound of the Formula 3. |

These solutions are diluted in the ratio of 1:10. 200 cc. of each diluted solution were treated with 0.5 cc. of a casein solution which had been infested by microorganisms and had already undergone decomposition and the mixtures were then kept at 35 to 40° C. in a thermostat. The time of stability of these solutions was then measured, initial putrefaction or decomposition respectively being easy to identify by the intense, unpleasant odor.

The test series yielded the following results.

| Solution: | Stable for ... days |
|---|---|
| a | <1 |
| b | 3 |
| c | 19 |
| d | >50 |
| e | >50 |
| f | >50 |
| g | >10 |

(b) As described under (a) above aqueous solutions are prepared containing each 20% of casein, 2.4% of $Na_2B_4O_7 \cdot 10H_2O$, as well as the following additives:

| Solution: | Additive |
|---|---|
| a | None. |
| b | 0.3% of the compound of the Formula 3. |
| c | 0.1% of the compound of the Formula 3. |
| d | 0.1% of the compound of the Formula 5. |
| e | 0.1% of the compound of the Formula 4. |
| f | 0.1% of the compound of the Formula 7. |

These solutions are diluted in the ratio 1:50. 200 cc of each of the diluted solutions are mixed as described under (a) above 0.5 cc. of a casein solution, rotted by microorganisms, and kept in a thermostat at 35 to 40° C. The result of this test series is shown in the following table:

| Solution: | Stable for ... days |
|---|---|
| a | <1. |
| b | 45. |
| c | At least 11. |
| d | At least 7. |
| e | At least 7. |
| f | At least 8. |

EXAMPLE 15

(a) An aqueous solution of the compound of the Formula 9 was added to a solution of a culture of *Escherichia* in glocuse broth. At a concentration of 1 part of additive principle per 100,000 parts of the culture solution, examination after 24 hours revealed that all bacteria had been killed.

(b) An aqueous solution of the compound of the Formula 5 was added to a culture of *Staphylococcus aureus* in glucose broth. At a concentartion of 1 part of active principle per 10,000 parts of the culture solution, examination after 24 hours revealed that all bacteria had been killed.

When an aqueous solution of the compound of the Formula 5 was added to a culture of *Staphylococcus aureus* at a concentration of 1 part of active principle per 100,000 parts of culture solution, examination after 6 days revealed a conclusive inhibition of the growth of the bacteria.

An aqueous solution of the compound of the Formula 9 at a concentration of 1 part of active principle per 1000 parts of culture solution was added to a culture of *Staphylococcu aureus* and of *Escherichia coli* respectively. After a contact time of only 2 minutes and 30 seconds the bacteria had been killed completely.

Similar antibacterial effects were observed when one of the compounds of the Formulae 3, 4 or 7 was used.

(c) An aqueous solution of the compound of the Formula 5 was added to a culture of *Trichophyton interdigitale* in a Sabouraud nutrient solution at a concentration of 1 part of active principle per 10,000 parts of culture solution; examination after 24 hours revealed that the fungi had been completely destroyed.

When an aqueous solution of the compound of the Formula 5 was added to a culture of *Trichophyton interdigitale* at a concentration of 1 part of active principle per 10,000 parts of culture solution, examination after 14 days revealed that the growth of the fungus had been completely inhibited. A similar antimycotic effect was obtained with any one of the compounds of Formulae 4, 7 and 9.

(d) An aqueous solution of the compound of the Formula 7 was added to a culture of *Endomyces albicans* (SOOR) in a Sabouraud nutrient solution. At a concentration of 1 part of active principle per 10,000 parts of culture solution, examination after 24 hours revealed that the fungi had been completely destroyed.

When an aqueous solution of the compound of the Formula 4 was added to a culture of *Endomyces albicans* (SOOR) at a concentration of 1 part of active principle per 10,000 parts of culture solution, examination after 14 days revealed that the growth of the fungi had been conclusively inhibited. A similar antimycotic effect was achieved with any one of the compounds (3), (5) or (9).

EXAMPLE 16

(a) An aqueous solution of the compound of the Formula 3 was mixed in suitable proportions with beer wort-agar to achieve a concentration of the active principle in the nutrient preparation of 0.5% by weight. The bottoms of Petri dishes were covered with this nutrient preparation and then sprayed with a suspension of spores of *Aspergillus niger*, whereupon the Petri dishes were incubated at about 35° C. in a thermostat.

(b) Petri dishes which had been prepared with beer wort-agar in identical manner containing 0.5% by weight of the compound of the Formula 3 were sprayed with a suspension of spores of *Chaetomium globosum* and suitabily incubated in a thermostat at about 35° C.

After a test period of 7 days no growth of fungi could be observed on the nutrient plates. Plates used in control experiments, covered with beer wort-agar but without addition of the compound of the Formula 3 and otherwise inoculated and incubated in identical manner, were completely overgrown by the fungus after a relatively short time. Similar results were obtained by using compound (4), (14) or (15) instead of compound (3).

EXAMPLE 17

Preparation of a cationactive shampoo 10 grams of the acetate of the compounds of the Formula 3 is stirred in a beaker with a little water to form a paste. The following products are added with heating and stirring: 18 grams of the condensation product from 1 mol of dodecylmercaptan with 8 to 10 mols of ethylene oxide, 6 grams of lactic acid, 2 grams of ricinoleic acid oxide, and 4 grams of the condensation product from 1 mol of hexamethylene di-isocyanate and 2 mols of a reaction product from 1 mol of oleyl alcohol and 80 mols of ethylene oxide. The paste is brought up to a weight of 200 grams with water. The mixture is filtered and the clear filtrate is mixed with 0.5 grams of a suitable perfume. The so-obtained stable solution is excellently suited for use as a shampoo which foams well, has a good washing strength, produces no disagreeable irritation of the skin and no stickiness of the hair (poissage effect). Shampoos with similar properties are obtained by using a compound of the Formulae 4 to 12 instead of the compound of Formula 3.

EXAMPLE 18

Preparation of a cationactive shampoo 60 grams of a condensation product of Formula 14 are stirred in a beaker on a water bath with 90 grams of a condensation product from 1 mol of dodecylmercaptan with 8 to 10 mols of ethylene oxide, 35 grams of lactic acid and 15 grams of a condensation product from 1 mol of hexamethylenediisocyanate and 2 mols of a reaction product from 1 mol of oleyl alcohol and 80 mols of ethylene oxide. The resulting paste is made up to a weight of 1000 grams with water. The mixture is filtered and the filtrate stirred with 2 grams of a suitable perfume. The so-obtained stable solution is excellently suited for use as a shampoo which foams well, has a good washing strength and produces no disagreeable irritation of the skin and no stickiness of the hair (poissage effect).

A shampoo with similar properties is obtained by using the compound of Formula 15 instead of the compound of Formula 14.

EXAMPLE 19

*Preparation of a deodorizing stick*

The following substances are heated under reflux and stirred: 94.9 grams of ethanol of 96% strength, 5.0 grams of sodium stearate, 0.1 gram of the acetate of the compound of Formula 3. The liquid mass is poured into cooled moulds. After cooling, the sick can be pushed out of the mould. The so-prepared deodorizing stick, applied in the usual manner, prevents an unpleasant body odour such as is produced by micro-organisms.

EXAMPLE 20

(a) Four specimens (I, II, III and IV) of 100 grams each are taken from a color paste containing 20% of copper phthalocyanine, nearly 80% of water and a slight quantity of an undefined organic byproduct resulting from the industrial manufacturing process of the copper phthalocyanine. 0.25% of the compound of Formula 3 is added to each of the specimens I and II.

Specimens I to IV are inoculated in Erlenmeyer flasks with a culture of mould fungi (containing Aspergillus and Pencillium genera) such as usually occur when products of the above composition are stored without the addition of a fungicide.

The inoculated specimens I to IV are stored at about 30° C. When checked for the first time at the end of four weeks it is found that specimens I and II containing the condensation product of Formula 3 show no growth of mould fungi, whereas specimens III and IV are entirely overgrown with mould fungi.

At the second check after 15 weeks it is found that specimens I and II are still free from mould fungi.

(b) Four specimens (I, II, III and IV) of 100 grams each are taken from a color paste containing 110 kilos of titanium dioxide, 8 kilos of casein and 82 liters of water. 0.25% of the compound of Formula 3 is added to each of the specimens I and II. Specimens I to IV are inoculated in Erlenmeyer flasks with a culture of mould fungi (containing Aspergillus and Pencillium genera) such as usually occur when products of the above composition are stored without the addition of a fungicide. The inoculated specimens I to IV are stored at about 30° C. At the first check at the end of four weeks it is found that specimens I and II containing the condensation product of Formula 3 show no growth of mould fungi, whereas specimens III and IV are entirely overgrown with mould fungi. At a second check at the end of 15 weeks specimens I and II are still free from mould fungi.

(c) Four specimens (I, II, III and IV) of 100 grams each are taken from a dispersion containing 40% of polyvinyl acetate, 5% of phthalic acid diethyl ester, 5% of starch and 50% of water. 0.25% of the compound of Formula 3 is then added to specimens I and II. Specimens I to IV are inoculated in Erlenmeyer flasks with a culture of mould fungi (containing Aspergillus and Pencillium genera) such as usually occur when products of the above composition are stored without the addition of a fungicide. The inoculated specimens I to IV are stored at about 30° C. At the first check at the end of 4 weeks it is found that specimens I and II containing the condensation product of Formula 3 show no growth of mould fungi, whereas specimens III and IV are entirely overgrown with mould fungi. At a second check at the end of 15 weeks specimens I and II are still free from mould fungi.

EXAMPLE 21

*Preparation of a detergent with a disinfecting effect*

(1) A mixture was prepared containing 1 part of the compound of Formula 3 and 10 parts of an aqueous solution of 30% strength of the reaction product from 8 mols of ethylene oxide and 1 mol of iso-octylphenol. (Composition I.)

(2) A mixture was prepared containing 1 part of the compound of Formula 3 and 10 parts of an aqueous solution of 30% strength of the reaction product from 9 mols of ethylene oxide and 1 mol of nonylphenol. (Composition II.)

(3) A mixture was prepared containing 1 part of the compound of Formula 3 and 10 parts of an aqueous solution of 30% strength of the reaction product from 35 mols of ethylene oxide and 1 mol of octadecyl alcohol. (Composition III.)

A culture of *Staphylococcus aureus* in glucose broth was added to the mixtures so-obtained in increasing dilutions. On making a check after 48 hours it was found that the growth of bacteria had been completely inhibited in the case of composition I with a concentration of 1 part of the active principle of Formula 3 per 1,000,000 parts of the culture solution, in the case of compositions II and III with a concentration of 1 part of the active principle of Formula 3 per 100,000 parts of the culture solution.

In addition, by subculture from the above culture solutions of *Staphylococcus aureus* on nutrient agar, a check made after 24 hours revealed that the bacteria had been killed completely in the case of compositions I, II and III with a concentration of 1 part of the active principle of Formula 3 per 100,000 parts of the culture solution.

Similar results were observed with cultures of *Escherichia coli*.

The ethylene oxide condensation products contained in compositions I, II and III showed practically no antibacterial activity by themselves in a control test.

What I claim is:

1. An amide of citric acid in which one

group of the citric acid radical is linked
  with one nitrogen atom of an alkylene diamine radical, the nitrogen atoms of which are separated from each other by 2 to 6 carbon atoms and which is further substituted at one nitrogen atom by an aliphatic hydrocarbon radical selected from the group consisting of dodecyl, hexadecyl, octadecyl and octadecenyl, and the second and third

groups of the citric acid radical are each linked with a member selected from the group consisting of
  (a) an alkylene diamine radical as defined above in this claim,
  (b) an aliphatic monoamine radical selected from the group consisting of ethanolamine and aminoethyl ethanolamine,
  (c) an aliphatic polyamine radical selected from the group consisting of N:N-dimethylamino trimethylene diamine, ethylene diamine and diethylene triamine,
  (d) a hydrazine radical,
  (e) a hydroxyl group, and
  (f) an aliphatic polyamine radical selected from the group consisting of ethylene diamine and diethylene triamine, which radical is linked at a second nitrogen atom with one

group of a second citric acid radical, the remaining

groups of this second citric acid radical being connected with a member selected from the group consisting of the radicals (a), (b), (c), (d) and (e) as defined above in this claim, the radicals (a), (b), (c), (d) and (f) being in any case attached to the

groups at a nitrogen atom.

2. The compound of the formula

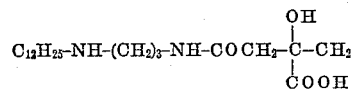

3. The compound of the formula

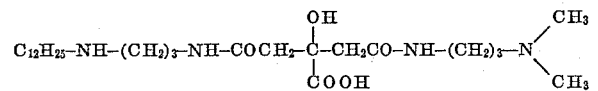

4. The compound of the formula

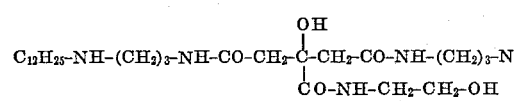

5. The compound of the formula

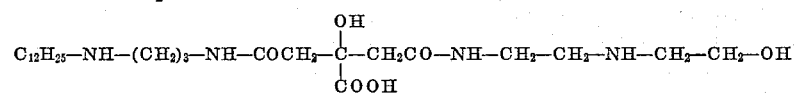

6. The compound of the formula

A—[—NH—CH$_2$—CH$_2$NH—]—A$_1$ in which A and A$_1$ each represent the radical

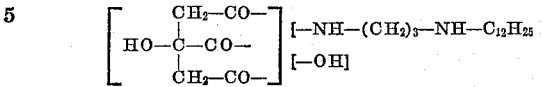

References Cited by the Examiner

UNITED STATES PATENTS

| | | | |
|---|---|---|---|
| 2,191,738 | 2/40 | Balle | 260—534 |
| 2,940,997 | 6/60 | Klager | 260—534 |
| 2,954,315 | 9/60 | Gordon et al. | 167—22 |
| 2,959,614 | 11/60 | McCord | 260—534 |
| 2,965,534 | 12/60 | Darlington | 167—22 |
| 3,056,832 | 10/62 | Stromberg | 260—534 X |

FOREIGN PATENTS 765,055  1/57  Great Britain.

LORRAINE A. WEINBERGER, *Primary Examiner.*

LEON ZITVER, *Examiner.*